US008332907B2

(12) United States Patent
Canning et al.

(10) Patent No.: US 8,332,907 B2
(45) Date of Patent: Dec. 11, 2012

(54) DETECTION AND MANAGEMENT OF CONTROLLED FILES

(75) Inventors: William Canning, Issaquah, WA (US); Michael L. Smith-Lonergan, Portland, OH (US)

(73) Assignee: Microsoft Corporation, Redmond, WA (US)

( * ) Notice: Subject to any disclaimer, the term of this patent is extended or adjusted under 35 U.S.C. 154(b) by 1227 days.

(21) Appl. No.: 11/766,851

(22) Filed: Jun. 22, 2007
(Under 37 CFR 1.47)

(65) Prior Publication Data
US 2009/0094679 A1 Apr. 9, 2009

(51) Int. Cl.
*G06F 17/00* (2006.01)
*H04L 29/06* (2006.01)
(52) U.S. Cl. .............. 726/1; 726/3; 726/14; 726/18; 726/22; 713/165; 709/224
(58) Field of Classification Search .............. 726/1–3; 713/163–165
See application file for complete search history.

(56) References Cited

U.S. PATENT DOCUMENTS

| 5,517,569 | A | 5/1996 | Clark |
| 5,699,428 | A | 12/1997 | McDonnal et al. |
| 6,023,506 | A | 2/2000 | Ote et al. |
| 6,978,367 | B1 * | 12/2005 | Hind et al. ............... 713/167 |
| 7,292,723 | B2 * | 11/2007 | Tedesco et al. ........... 382/159 |
| 7,451,488 | B2 * | 11/2008 | Cooper et al. ............ 726/25 |
| 7,559,080 | B2 * | 7/2009 | Bhargavan et al. ........ 726/1 |
| 7,580,356 | B1 * | 8/2009 | Mishra et al. ........... 370/230.1 |
| 7,627,891 | B2 * | 12/2009 | Williams et al. ......... 726/1 |
| 8,055,910 | B2 * | 11/2011 | Kocher et al. ........... 713/193 |
| 8,234,640 | B1 * | 7/2012 | Fitzgerald et al. ....... 718/1 |
| 2003/0131256 | A1 * | 7/2003 | Ackroyd ............... 713/201 |
| 2003/0159070 | A1 * | 8/2003 | Mayer et al. ........... 713/201 |
| 2004/0093506 | A1 | 5/2004 | Grawrock et al. |
| 2005/0060561 | A1 * | 3/2005 | Pearson et al. .......... 713/194 |
| 2005/0060568 | A1 * | 3/2005 | Beresnevichiene et al. .. 713/200 |
| 2005/0066183 | A1 | 3/2005 | Douceur et al. |
| 2006/0018484 | A1 | 1/2006 | Yoshihiro et al. |
| 2006/0021048 | A1 * | 1/2006 | Cook et al. ............ 726/25 |
| 2006/0048224 | A1 * | 3/2006 | Duncan et al. .......... 726/22 |
| 2006/0075228 | A1 | 4/2006 | Black et al. |
| 2006/0090193 | A1 * | 4/2006 | Johnson et al. .......... 726/1 |
| 2006/0117178 | A1 | 6/2006 | Miyamoto et al. |

(Continued)

FOREIGN PATENT DOCUMENTS
WO WO2006119253 A2 11/2006

OTHER PUBLICATIONS

Shi, W, Infoshield: a security architecture, Feb. 2006, IEEE, vol. 12, pp. 4-8.*

(Continued)

*Primary Examiner* — Nathan Flynn
*Assistant Examiner* — Viral Lakhia
(74) *Attorney, Agent, or Firm* — Rau Patents, LLC

(57) ABSTRACT

A remote device may receive a policy definition, search a file system for files that are to be protected, and disposition identified files to protect the files. After completing the protection, a report is generated and transmitted to a centralized location. The policy definition may include keywords, directory paths, metadata, or other information that may be used to identify files for protection. After identification, the files may be dispositioned by removal, tagging, encrypting, applying rights management, or other actions.

17 Claims, 3 Drawing Sheets

U.S. PATENT DOCUMENTS

| | | | | |
|---|---|---|---|---|
| 2007/0028303 | A1* | 2/2007 | Brennan | 726/24 |
| 2007/0143824 | A1* | 6/2007 | Shahbazi | 726/1 |
| 2007/0261112 | A1* | 11/2007 | Todd et al. | 726/11 |
| 2008/0040776 | A1* | 2/2008 | Bauer et al. | 726/3 |
| 2008/0072032 | A1* | 3/2008 | Cohen et al. | 713/100 |
| 2008/0098478 | A1* | 4/2008 | Vaidya et al. | 726/24 |

OTHER PUBLICATIONS

"Security for Policy and Access Management", pp. 160.

"HandyCrypto", retrieved on Jun. 11, 2007, at <<http://y0ys.com/encryption-software/overview.htm>>, YOYS Software, 2002-2007, pp. 1-2.

"Entrust Tackles Next Level of Data Vulnerability by Introducing Network Folder Encryption Solution for Workgroups", retrieved on Jun. 11, 2007 at <<http://news.thomasnet.com/fullstory/501325>>, Thomas Publishing Company, 2007, pp. 1-4.

"Private Encryptor 6.2", retrieved on Jun. 11, 2007 at <<http://pcwin.com/Utilities/Security_Encryption/Private_Encryptor/index.htm>>, PCWin Download Center, 1995-2007, pp. 1-2.

\* cited by examiner

DETECTION AND MANAGEMENT OF CONTROLLED FILES

BACKGROUND

Security is a major issue in corporate information technology departments. Many times, an employee may have sensitive information that may be on a portable device, such as a laptop. If the laptop were ever stolen or lost, the sensitive information may be compromised, leading to many potential legal and business issues.

Many encryption systems may be available for encrypting or otherwise protecting data. Such systems, if applied to an entire data storage system, may cause a large amount of computational overhead to be expended. In many deployments, encryption systems may apply encryption to a limited set of files, such as the files contained in specific folders of a file system.

Problems may occur when a user moves a file out of a protected directory to an unprotected directory, either intentionally to avoid slow access times due to encryption, or inadvertently. Such files may be left unprotected and a company may be at risk of losing sensitive data.

SUMMARY

A remote device may receive a policy definition, search a file system for files that are to be protected, and disposition identified files to protect the files. After completing the protection, a report is generated and transmitted to a centralized location. The policy definition may include keywords, directory paths, metadata, or other information that may be used to identify files for protection. After identification, the files may be dispositioned by removal, tagging, encrypting, applying rights management, or other actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
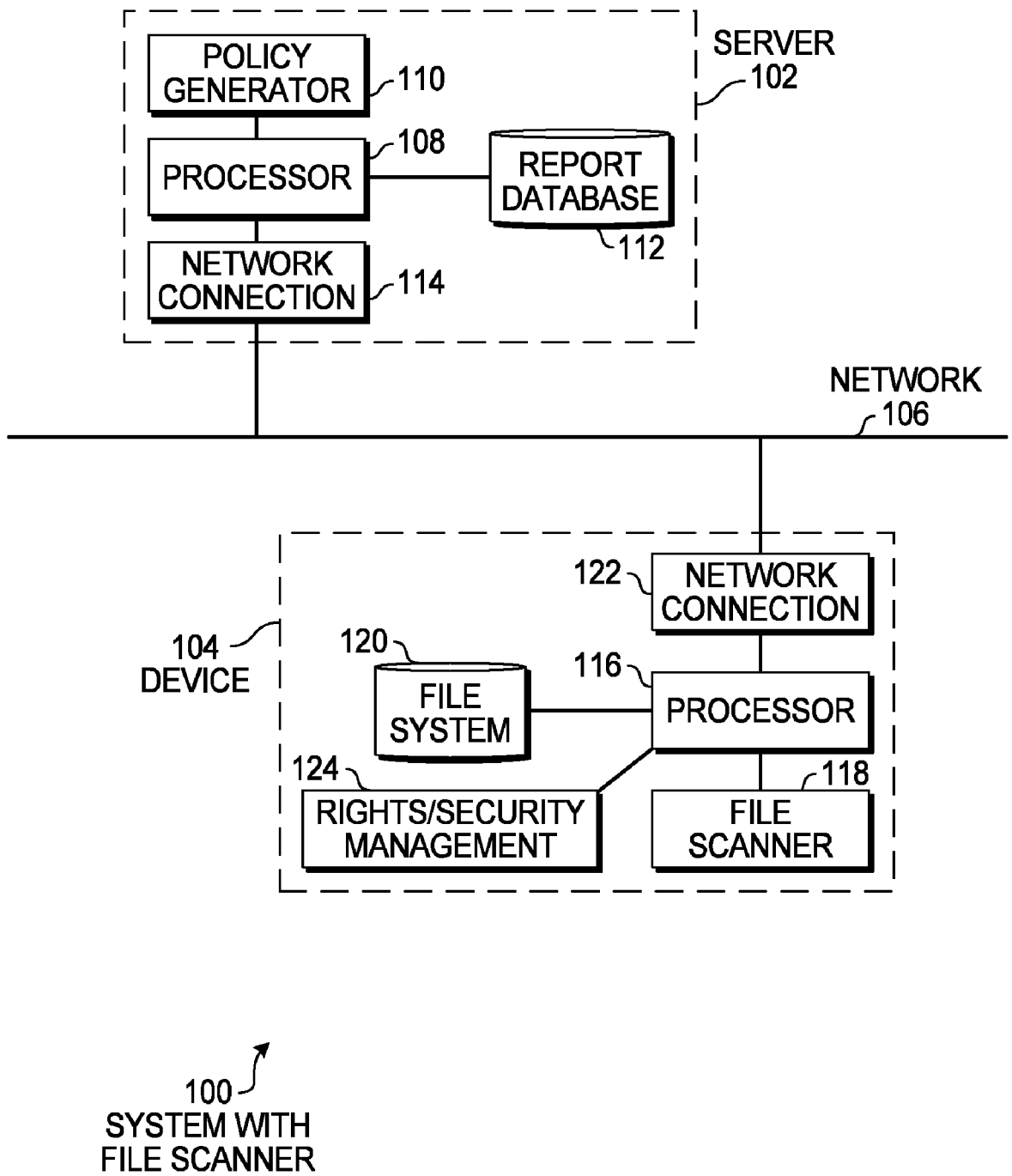
FIG. 1 is a diagram illustration of an embodiment showing a system with a file scanner.

Security policies may be defined by an administrator and pushed or pulled to a device that applies the policies. Storage media on the device may be scanned for files or directories that meet specific search parameters and those files or directories may have the security policy applied.

A typical security policy may apply encryption, rights management, or other actions to a file or directory. In some instances, a security policy may cause the file or directory to be deleted, moved to another location, or otherwise dispositioned.

The scanning process may detect files that were under a security policy but have been inadvertently or intentionally changed so that a previously applied security policy has been overridden. For example, a file system may be configured so that sensitive data is stored in an encrypted folder. If a user inadvertently or intentionally moved a file from the encrypted folder to an unencrypted folder, the file may be unprotected. A file scan may detect the file and apply a remediation or policy to the file.

After scanning and applying the security policies to a file system, a report may be generated and transmitted to a server or administrator. The report may be a verification that the security policies have been applied.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a file scanner. Embodiment 100 is a system that may have a policy defined at a server 102 and sent to a remote device 104 over a network 106. The remote device 104 may scan various storage media for files or directories that meet search criteria and apply the security policy to the file or directory.

Embodiment 100 is an example of a system that may be deployed in a corporate environment where a remote device 104 may contain sensitive information. For example, the remote device 104 may be a portable computer that is used by an employee when the employee travels for business. Various sensitive data on the portable computer may be protected by encryption, for example. If the device were ever lost or stolen, the encrypted data may be difficult for a third party to access and thereby prevent the data from being easily copied and used for nefarious purposes.

In a typical embodiment, some data, files, or directories in storage media on the device 104 may be unprotected. For example, operating system files and folders may be unprotected as well as some application executable and data files. Other information may be encrypted or otherwise protected. Such a configuration may be used when the encryption or other protection scheme may cause the performance of the system to suffer, so the protection scheme may be applied to sensitive information and not to other data.

Sometimes users may intentionally or unintentionally move a file or change data on a system and leave sensitive data unprotected. For example, a user may intentionally copy a sensitive file from a protected folder to an unprotected folder so that the user may realize improved performance of the system. If the user's system were stolen or lost in such a state, sensitive information may be compromised.

In another example, a user may copy a portion of a file or data containing sensitive information and create a new file containing the sensitive information. In some instances, the new file may contain sensitive information but may not be protected.

Because a user may be continually operating the device 104 and manipulating the various files and data on the device 104, there may be many opportunities where sensitive data may be placed in an unprotected state.

Embodiment 100 may perform a periodic scan of the device 104 to identify files, directories, or data that is sensitive and apply a security policy to the files. By performing a periodic scan, any inadvertent or intentional changes to the security settings for a particular file or directory may be corrected.

When a scan is performed, a report may be generated and sent to the server 102. The report may be used by a security administrator to track compliance with security practices as well as give a status of the device if the device would ever be stolen or lost. When a device is stolen and sensitive information is on the device, a security administrator may use a recent report to document the security of the data.

Scans of files, directories, and data may include scanning specific locations in a file system as well as evaluating the naming and content of files. In many cases, a directory structure may have specific portions of the structure allocated to sensitive information. The portions may have an automated or default security routine that applies encryption or specific settings to files located in the portions. Such a portion of a directory structure may be a specific directory, a directory and any subdirectory, or any other definition.

The content of files or data may be evaluated by scanning files or data for specific keywords, phrases, or other indicators of a file's content to determine if sensitive information exists in the file. In some cases, a file or dataset may have links to other files. If such links point to content that may be sensitive, the file itself may be determined to be sensitive and have a security policy applied.

In some cases, the name of a file or a file name extension may indicate that the file may be sensitive and have a security policy applied. For example, a policy may be applied to word processor documents, spreadsheets, or data related to a specific application, regardless of content or location.

Other content may be evaluated using metadata associated with the content. For example, if a file's properties contain specific keywords, pointers to sensitive files, tags with specific keywords, or some other metadata, the file may have a security policy applied.

Each embodiment may have different mechanisms for determining what data or which files or directories to which a security policy may be applied.

The server 102 may have a processor 108 that has a policy generator 110, a report database 112, and a network connection 114. The server 102 may be any type of network connected device. In a typical embodiment, the server 102 may be a server computer or personal computer attached to the network 106.

The policy generator 110 may be a software application that may be executed by the processor 108. The policy generator 110 may enable an administrator to define a security policy for the device 104. In some instances, the policy generator 110 may generate a security policy that may be used by many different devices.

The policy generator 110 may have a graphical user interface or another type of user interface that may enable an administrator to define a security policy.

The policy may be simple or complex, depending on the embodiment. In some cases, a security policy may have several different sets of search parameters, each having a different action or policy that may be applied to items fitting the search parameters. For example, search criteria for items in a protected directory may have an action or policy applied to those items such as to encrypt the files. Items found outside of the protected directories that have sensitive keywords may have a security policy applied that deletes the files permanently. In some instances, an item found with one keyword may have one policy applied, while an item with a different keyword may have a different policy applied.

The network connection 114 may enable the server 102 to communicate with the device 104 over the network 106. The network 106 may be any type of communications medium by which two devices may communicate. In many instances, the network 106 may comprise a local area network (LAN), a wide area network (WAN), the Internet, a wireless connection, or any other communication medium or connection. In some cases, the connection may include connections through several different media or networks.

The report database 112 may contain reports from the device 104 after performing a search and applying the security policy. In some cases, the report database 112 may be used to determine a user's compliance with security practices, analyze the vulnerability of various devices, and document the latest status of the device from a security standpoint. Such reports may be useful in assessing potential damage when a device is lost or stolen and identifying which data may have been compromised.

The configuration of the report database 112 may be any type of data storage and retrieval system. In some instances, a database management system may be used to store report data. In other instances, text based reports may be stored in individual files in a directory. In still other instances, email based reports may be stored in an email repository. In some embodiments, the most recent report may be stored and other reports may be discarded. Other embodiments may keep multiple reports from each device. Each embodiment may use a different storage system and archiving mechanism.

The device 104 may have a processor 116 that may execute a file scanner 118 that scans a file system 120. The device 104 may connect to the network 106 using a network connection 122.

The file scanner 118 may be an application that scans the file system 120 for files, data, or directories meeting specific search criteria. When an item has been found, a security policy may be applied.

The file system 120 may be any organization of data on a storage medium that may be available to the processor 116. In some cases, the file system 120 may include removable storage devices. In other cases, the file system 120 may include storage devices that are attached to other devices, such as file system available over a network. The file scanner 118 may be adapted to scan any file system accessible by the processor 116, including file systems available over the network 106.

In some instances, a rights or security management system 124 may be employed to control access to specific files or data. For example, a file containing sensitive information may be discovered and placed under the control of a rights management system 124 so that other users may not have access, so that the user may not be able to transmit or copy the file, or place some other restriction on the use of the file or data. In some cases, a rights or security management system 124 may enable access after authentication or provide other limits to the access and manipulation of the data.

Figure 2:
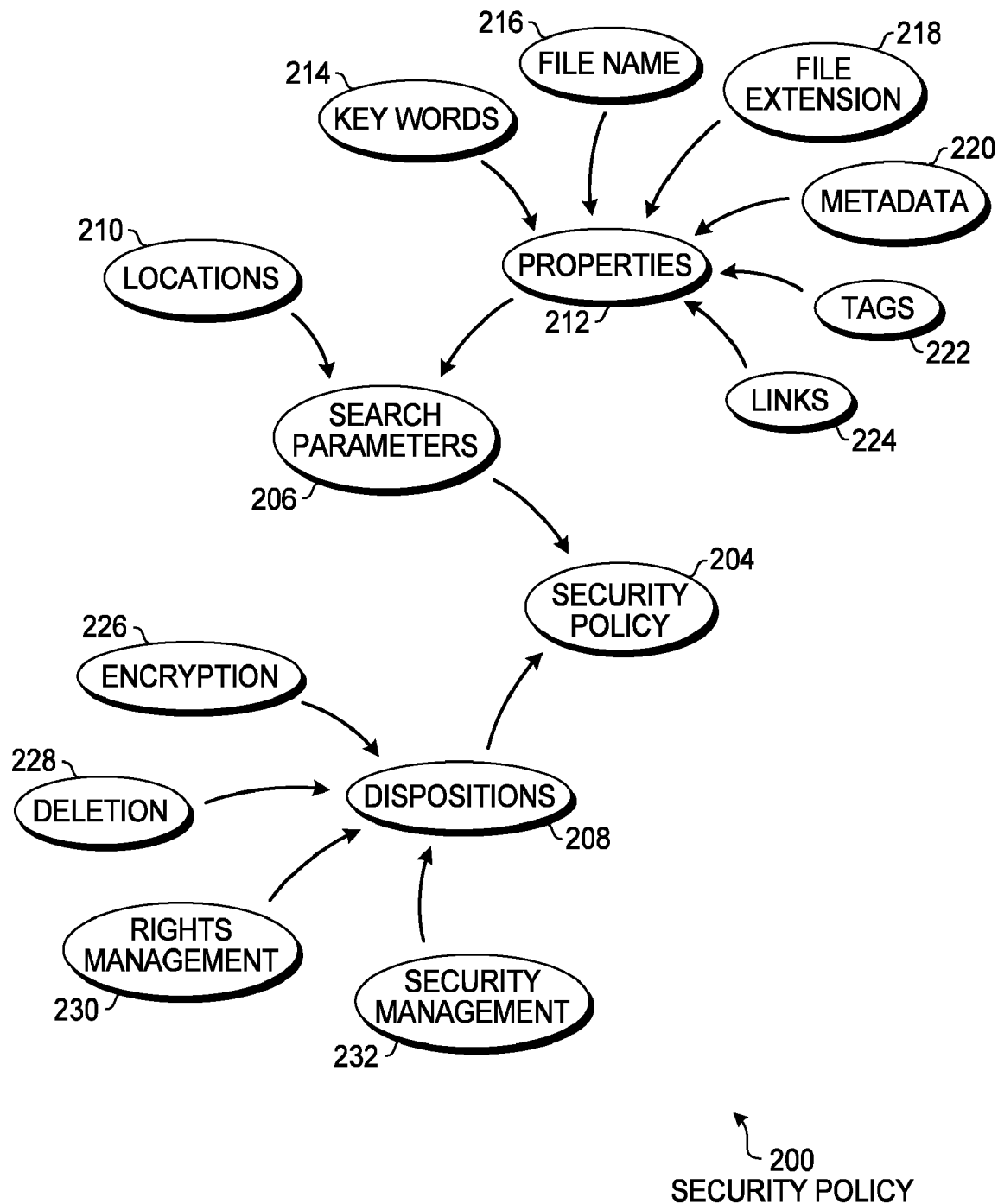
FIG. 2 is a diagram illustration of an embodiment showing elements that may make up a security policy.

FIG. 2 is a diagram illustration of an embodiment 200 showing a security policy. The security policy 204 may be comprised of a set of search parameters 206 and dispositions 208. For each set of search parameters, one or more dispositions or actions may be defined. In some cases, a search policy 204 may contain many groupings of search parameters and dispositions.

The search parameters 206 may encompass any type of information that may be used to find a file, directory, or data that may be considered sensitive and may be protected. Such protected elements may be defined by the location of the file 210 or by various properties 212 associated with the file, data, or directories.

Throughout this specification, a file is used as an example of the smallest item to which a security policy may be applied. In some embodiments, a group of data within a file may have a security policy applied. For example, a file may contain several email documents, one of which is sensitive. In such a case, it may be possible to protect the sensitive document through digital rights management, encryption, deletion, or some other disposition. Similarly, some security policies may be applied to a group of files in the form of a directory or some other grouping. In such a case, each file located within a directory or being a member of a group may have a security policy applied.

For the purposes of this specification and the claims, any reference to a file shall indicate a reference to the smallest item to which a security policy may be applied for an embodiment. In some cases, such an item may be larger than a file, such as a directory or group of files, while in other cases, such an item may be smaller than a file, such as a portion or section of a file. Each embodiment may use a different definition of the smallest item that may be protected.

The location 210 of a file, data, or directory in a file structure may be used to apply a security policy. For example, files or data included in a specific directory may have a policy applied, and the policy may be inherited by any subdirectories and files in those subdirectories.

The search parameters 206 may be tailored to a specific embodiment. In some cases, a file scanner may be capable of searching for certain types of search parameters but not others. The list of search parameters discussed herein is meant to be exemplary and not exhaustive.

Various parameters 206 may be examined to determine if a file, data, or directory may contain sensitive information to which a security policy may be applied. For example, specific keywords 214 in a file may indicate that the contents may be sensitive. The keywords 214 may include individual words, phrases, text portions, or other patterns within the data.

In some cases, file names 216 and file extensions 218 may be examined to determine if a file, data, or directory may contain sensitive information. In some cases, a file may not contain sensitive information but may have a security policy applied due to the file name 216 or file extension 218 that are defined. A security administrator may select all files with a particular naming convention or file extension to be protected, regardless of content.

Various metadata 220 and tags 222 associated with a file, data, or directory may indicate that the information may be sensitive. Many files have a metadata section that may include an author, the creator of the file, contents of the file, or other metadata. Tags 222 may be associated with a file, data, or directory and may also indicate that the information may be sensitive.

Some files or data may contain links 224. Links may point to data that are sensitive and indicate that the contents of the file or data are also sensitive.

In some instances, a search parameter 206 may be defined in a complex manner, such as a complex search statement that includes specific parameters or ranges of parameters and excludes other parameters. Many different search parameters may be joined into a complex search statement.

When a file, data, or directory is found using the search parameters 206, various dispositions 208 may be applied. The dispositions 208 may include encryption 226, where the file, data, or directory is encrypted using any type of encryption protocol.

In some cases, a file, data, or directory may be dispositioned by deleting the information. For example, sensitive data that are found in an inappropriate or unexpected location on a computer that is shared by many different workers may be deleted. An example may be a computer in a call center where many users operate a computer that may have access to sensitive customer information. When a file scanner detects that sensitive information is improperly located or may have been mishandled, the information may be deleted to protect inadvertent or intentional misuse of the information.

A rights management system 230 or security management system 232 may be applied to a sensitive file, data, or directory in some cases. The rights management system 230 may be a system that applies restrictions for viewing, copying, moving, or using data. A security management system 232 may apply encryption or other security measures to a file, data, or directory.

The dispositions 208 discussed above are merely examples of actions that may be taken when a file, data, or directory is discovered using the search parameters 206. Some embodiments may have more or different options, while other embodiments may have fewer.

Figure 3:
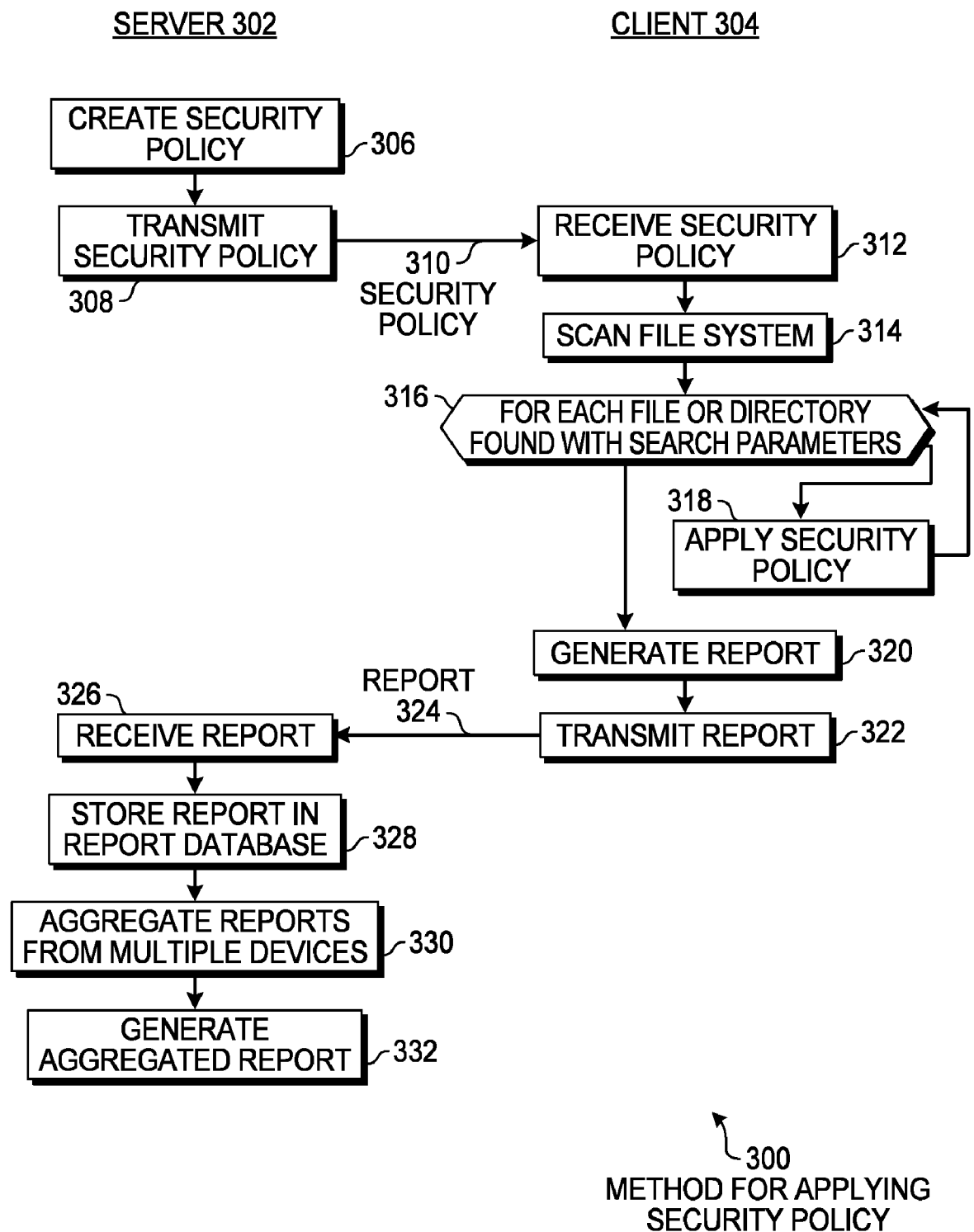
FIG. 3 is a flowchart illustration of an embodiment showing a method for applying a security policy.

FIG. 3 is a flowchart illustration of an embodiment 300 showing a method for applying a security policy. Embodiment 300 illustrates one method by which a server 302 and client 304 may communicate and perform various tasks to apply a security policy. The server 302 may define the policy, send the policy to the client which performs a scan of the file system and applies the security policy. Afterwards, the client 304 may generate a report and transfer the report to the server 302. In some embodiments, the server 302 may periodically query the client 304 to obtain information regarding the success or failure of the security policy application.

The actions of the server 302 are illustrated on the left and the actions of the client 304 are illustrated on the right.

The server 302 creates a security policy in block 306 and transmits the security policy in block 308. The security policy may be created using any appropriate mechanism. In some instances, an application with a graphical user interface may be used, while in other cases, a security policy may be defined using text, XML, or other definition using a text editor.

The security policy 310 is transmitted in block 308 and received in block 312. In some embodiments, the server 302 may push the security policy 310 to the client 304, while in other embodiments, the client 304 may pull the security policy 310 from the server 302. In such an embodiment, the client 304 may contact the server 302 and request the security policy 310. In another of such an embodiment, the server 302 may store the security policy 310 in an accessible location and the client 304 may access the location and retrieve the security policy 310.

After receiving the security policy in block 312, the client 304 may scan the file system in block 314. The scan may be performed in any manner in order to determine which files, data, or directories match a search parameter or group of search parameters. The parameters may be defined in any manner for a particular embodiment.

The scan of block 314 may produce one or more items that match the search parameters. For each of those items in block 316, the security policy is applied in block 318. The security policy applied in block 318 may be any action or setting that may be applied as defined in a security policy.

The embodiment 300 illustrates a method by which a search of all matching items is found and then each one is processed. Other embodiments may process each item as it is found.

After processing the items in block 316, a report may be generated in block 320. The report may contain different information in different embodiments. In many cases, the report may include details about the success or failure of the file system scan and the application of security policies. In some cases, the report may include a time stamp and various information about the client 304.

The report 324 may be transmitted in block 322 by the client 304 and received in block 326 by the server 302. In some embodiments, the client 304 may transmit the report to the server 302. In other embodiments, the server 302 may query the client 304 to initiate transmission of report 304. In still other embodiments, the client 304 may store the report 324 in a known location accessible by the server 302, and the server 302 may fetch the report 324. Each embodiment may have a different communication sequence and protocol used to transfer information between the server 302 and the client 304.

The report may be stored in a report database in block 328. The database may be any type of storage for the report, and may vary based on the type of data contained in a report, how the report is transmitted, and how the report may be analyzed.

In some embodiments, reports from multiple devices may be aggregated in block 330 and an aggregated report may be generated in block 332. An aggregated report may be used to summarize the status of multiple devices and may be useful for monitoring a large group of devices.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a security policy from a remote server, said security policy defining at least one protected element, said at least one protected element comprising a portion of content of a file, and a disposition action for a file containing said protected element, said protected element containing sensitive information;
   scanning a portion of a file system that is not currently subjected to the security policy for files containing said at least one protected element, comprising at least one of a group composed of a keyword; a file name extension; a link to a protected object, a filename and a metadata element, said protected element within the file having been previously subjected to the security, policy, but due to an action performed by a user no longer subjected to the security policy;
   finding in the portion of the file system a first file containing both said protected element and at least one unprotected element;
   applying the security policy to the first file; and
   performing said disposition action on said first file.

2. The method of claim 1, said security policy further comprising a disposition action for a directory for said file.

3. The method of claim 1, said metadata element comprising at least one of a group composed of:
   tags for said file; and
   properties for said file.

4. The method of claim 1, said disposition action comprising at least one of a group composed of:
   encrypting said file;
   deleting said file;
   applying rights management to said file;
   modifying metadata for said file; and
   applying security descriptors to said file.

5. The method of claim 1 further comprising:
   generating a report based on said scanning and said performing said disposition action.

6. The method of claim 5 further comprising:
   transmitting said report to said remote server.

7. A computer readable storage medium, excluding transmission media, comprising computer executable instructions adapted to perform the method of claim 1.

8. A method comprising:
   defining a security policy, said security policy defining at least one protected element and a disposition action for a file containing said at least one protected element, said protected element containing sensitive information, and comprising a portion of content of the file; said protected element further comprising at least one of a group composed of a keyword; a file name extension; a link to a protected object, a filename and a metadata element,
   transferring said security policy to a remote device, said remote device being adapted to:
   scan a portion of a file system that is not currently subjected to the security policy for said at least one protected element contained in a portion of a file to find a first file, said first file comprising both said at least one protected element and at least one unprotected element, said at least one protected element having been moved by a user of the remote device prior to the scan from a protected region of the file system to an unprotected region of the file system;
   apply said security policy to said first file;
   performing the disposition action on the first file; and
   receive a report from said remote device, said report being based on said scanning and said applying.

9. The method of claim 8, said security policy being pulled by said remote device.

10. The method of claim 8, said disposition action comprising at least one of a group composed of:
    encrypting said file;
    deleting said file;
    applying rights management to said file;
    modifying metadata for said file; and
    applying security descriptors to said file.

11. A computer readable storage medium, excluding transmission media, comprising computer executable instructions adapted to perform the method of claim 8.

12. A system comprising:
    a policy generator adapted to generate a security policy defining at least one protected element contained within a portion of a file, said protected element comprising at least one of a group composed of a keyword; a file name extension; a link to a protected object, a filename and a metadata element, and a disposition action for the file containing said protected element, said protected element containing sensitive information;
    a file scanner operable and executed on a processor of a remote device and adapted to:
    scan a portion of file system that is not currently subjected to the security policy for said at least one protected element in a portion of a file to find a first file, said first file comprising both said at least one protected element and at least one unprotected element said protected element within the file having been previously subjected to the security policy, but due to actions performed by a user no longer subjected to the security policy;
    apply said security policy to said first file, and
    perform said disposition action on said first file.

13. The system of claim 12, said policy generator being connected to said remote device by a network.

14. The system of claim 12, said disposition action comprising
    at least one of a group composed of:
    encrypting said file;
    deleting said file;
    applying rights management to said file;
    modifying metadata for said file; and
    applying security descriptors to said file.

15. The system of claim 12, said file scanner further adapted to:
    generate a report based on said scanning.

16. The system of claim 15 further comprising:
    a report database adapted to store said report.

17. The system of claim 12 being comprised in computer executable instructions on a computer readable storage media, excluding transmission media.

* * * * *